US006903747B2

(12) United States Patent
Kakutani

(10) Patent No.: US 6,903,747 B2
(45) Date of Patent: Jun. 7, 2005

(54) IMAGE PROCESSING APPARATUS, PRINT CONTROL APPARATUS, METHOD OF IMAGE PROCESSING, AND RECORDING MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 09/967,891

(22) Filed: Sep. 28, 2001

(65) Prior Publication Data

US 2002/0075278 A1 Jun. 20, 2002

(30) Foreign Application Priority Data

Oct. 6, 2000 (JP) ........................................ 2000-307981
Aug. 6, 2001 (JP) ........................................ 2001-238097

(51) Int. Cl.[7] .................................................. G09G 5/02
(52) U.S. Cl. ...................... 345/600; 345/589; 345/591; 345/597; 345/603; 345/604
(58) Field of Search ................................ 345/589, 591, 345/597, 600, 603, 604

(56) References Cited

U.S. PATENT DOCUMENTS

| 4,654,721 A | | 3/1987 | Goertzel et al. | |
| 5,596,428 A | * | 1/1997 | Tytgat et al. | 358/518 |
| 5,742,410 A | | 4/1998 | Suzuki | |
| 5,847,850 A | | 12/1998 | Kadowaki | |

FOREIGN PATENT DOCUMENTS

| EP | 0452066 A2 | 10/1991 |
| JP | 08-307717 | 11/1996 |
| JP | 11-088683 A | 3/1999 |
| JP | 2000-184194 | 6/2000 |

OTHER PUBLICATIONS

Notification of Reason for Rejection, Japanese Patent Office, Patent Application No.: 2001–238097, Representative/Applicant: Meisei International Patent Firm, Dispatch Date: Jun. 22, 2004.

* cited by examiner

*Primary Examiner*—Matthew C. Bella
*Assistant Examiner*—Tam Tran
(74) *Attorney, Agent, or Firm*—Beyer Weaver & Thomas LLP

(57) ABSTRACT

The technique of the present invention carries out color conversion of first image data expressed by a first color system into second image data expressed by a second color system. The procedure first collects multiple adjoining pixels of the first image data into one block, and calculates a tone difference of the first image data in the block based on the first image data of the respective pixels. When the calculated tone difference is less than a preset value, procedure carries out collective color conversion without discrimination of the respective pixels included in the block. This enables the high-speed color conversion. When the calculated tone difference is not less than the preset value, on the other hand, the procedure carries out color conversion by a unit of each pixel included in the block. This prevents deterioration of the picture quality. The technique of the invention thus ensures the high-speed color conversion without deteriorating the picture quality.

16 Claims, 10 Drawing Sheets

IMAGE PROCESSING APPARATUS, PRINT CONTROL APPARATUS, METHOD OF IMAGE PROCESSING, AND RECORDING MEDIUM

BACKGROUND OF THE INVENTION

1. Field of the Invention

The present invention relates to a technique for attaining high-speed color conversion of color image data.

2. Description of the Related Art

Application of an image display device, such as a color printer or a liquid crystal display unit, enables a color image to be displayed, based on color image data. Such image display devices are widely used as output devices of various image-related equipment like a computer.

The image display device combines a plurality of preset base colors to express a diversity of colors. The procedure for displaying a color image divides an original image into a plurality of small areas called pixels and expresses the colors in the respective pixels by combinations of the multiple base colors. Expression of the colors in the respective pixels leads to display a color image as a whole. The image display device receives a supply of color image data, which represents a mapping of the combination of tone values of the base colors to each pixel.

The base colors used for expression of color image data may be different from the base colors used by the image display device to display color images. In one example, the supplied color image data is expressed by combinations of three primary colors of light, that is, red (R), green (G), and blue (B), while the image display device uses combinations of three primary colors of ink, that is, cyan (C), magenta (M), and yellow (Y). In such cases, it is required to convert the color image data expressed by the tone values of the respective R, G, and B colors into another expression format based on the tone values of the respective C, M, and Y colors. Even when both the supplied color image data and the image display device use the combinations of R, G, and B colors for expression of a color image, there may be some difference in colors of R, G, and B between the color image data and the image display device. In such cases, in order to display an image of right colors, it is required to convert the master image data into image data expressed by the combinations of the R, G, and B colors used by the image display device. The process of converting master color image data into image data expressed by combinations of different base colors is generally referred to as color conversion. As mentioned above, the color image data is expressed by mapping the combination of tone values of the respective base colors to each pixel. The color conversion process thus converts the combination of tone values of original base colors into a combination of tone values of different base colors with regard to each pixel.

In such image display devices, with a view to displaying higher-quality images, the number of pixels per image tends to increase gradually. The increase in number of pixels allows division of an image into smaller areas for expression. This makes the respective pixels sufficiently inconspicuous and ensures expression of a higher-quality image.

The conventional color conversion process is carried out by the unit of a pixel. An increase in number of pixels thus undesirably lengthens the time required for color conversion of image data. The time-consuming color conversion makes it difficult to display a processed image within a short time.

SUMMARY OF THE INVENTION

The object of the present invention is thus to provide a technique that ensures high-speed color conversion even under the condition of an increase in number of pixels included in an image.

At least part of the above and the other related objects is attained by an image processing apparatus that carries out color conversion of first image data expressed by a first color system into second image data expressed by a second color system. The image processing apparatus includes: a block information detection module that collects multiple adjoining pixels of the first image data into one block and detects block information, which is related to a tone difference between the multiple adjoining pixels in the block; a first color conversion module that certifies a level of the tone difference between the multiple adjoining pixels in the block based on the detected block information, and with regard to a block having a large tone difference level, carries out color conversion by a unit of each pixel included in the block; and a second color conversion module that, with regard to a block having a small tone difference level, carries out collective color conversion for the each adjoining pixel included in the block.

There is an image processing method corresponding to the above image processing apparatus. Accordingly the present invention is directed to an image processing method that carries out color conversion of first image data expressed by a first color system into second image data expressed by a second color system. The image processing method includes the steps of: (A) collecting multiple adjoining pixels into one block; (B) detecting block information, which is related to a tone difference between the multiple adjoining pixels in the block; (C) certifying a level of the tone difference between the multiple adjoining pixels in the block based on the detected block information, and with regard to a block having a large tone difference level, carrying out color conversion by a unit of each pixel included in the block; and (D) with regard to a block having a small tone difference level, carrying out collective color conversion for the each adjoining pixel included in the block.

In the image processing apparatus and the corresponding image processing method, the procedure detects the block information related to the tone difference of the first image data in the block, and determines the type of the block, based on the detected block information. Namely the procedure determines whether the block has a large tone difference between multiple adjoining pixels in the block or a small tone difference. With regard to the block having a large tone difference, the procedure carries out the color conversion by the unit of a pixel in the block. With regard to the block having a small tone difference, the procedure carries out the collective color conversion without discriminating the respective pixels in the block.

In the block having a small tone difference of the image data in the block, it is thought that the respective pixels have no significant difference in image data. The collective color conversion of the respective pixels in the block thus does not significantly deteriorate the picture quality. In the block having a large tone difference of the image data in the block, on the other hand, the color conversion is carried out by the unit of each pixel in the block. This arrangement ensures the appropriate color conversion without deteriorating the picture quality, even when there is a large tone difference of the first image data in the block. The technique of the present invention detects the block information related to the tone difference of the first image data in the block, calculates the tone difference of the first image data in the block based on the detected block information, and carries out color conversion according to the calculation. This arrangement desirably ensures high-speed color conversion while maintaining the picture quality.

The block information may be tone differences obtained by analyzing image data of the respective pixels included in the block. In the case where image data is created by an application program for image formation, another applicable procedure stores a specific area defined by a contour line and pained out, detects information regarding the position of the block as the block information, and determines whether or not the block is included in the specific area.

In the image processing apparatus and the corresponding image processing method, one preferable application calculates the tone difference of the first image data between the multiple adjoining pixels in the block as the block information, carries out the color conversion by the unit of each pixel included in the block when the calculated tone difference is not less than a preset value, and carries out the collective color conversion without discrimination of the respective pixels included in the block when the calculated tone difference is less than the preset value.

This application of the image processing apparatus and the corresponding image processing method carries out collective color conversion of the respective pixels in the block, when the tone difference of the image data in the block is less than the preset value. The collective color conversion under such conditions hardly affects the picture quality. When the tone difference of the image data in the block is not less than the preset value, on the other hand, the application carries out color conversion by the unit of each pixel in the block. This arrangement ensures appropriate color conversion without deteriorating the picture quality. In this manner, the technique of the present invention changes over the procedure of color conversion, based on the results of the comparison between the tone difference between the multiple pixels in the block and the preset value. This arrangement ensures high-speed color conversion while effectively maintaining the picture quality.

In the image processing apparatus of the present invention, another preferable application stores a color conversion table, which represents mapping of a combination of tone values of respective colors in the first color system to a combination of tone values of respective colors in the second color system, and refers to the color conversion table to implement the color conversion. This application carries out color conversion of the first image data into the second image data by referring to the color conversion table. The arrangement effectively ensures high-speed color conversion.

In the image processing apparatus, one preferable procedure selects a specific set of pixels that hold a predetermined positional relationship in the block, and calculates a tone difference of the first image data between the specific set of pixels.

The arrangement of selecting an appropriate set of pixels and calculating a tone difference of the image data between the appropriate set of pixels preferably simplifies the calculation of the tone difference in the block.

In the image processing apparatus, a difference between a maximum value and a minimum value of the first image data in the block may be calculated as the tone difference of the first image data.

The maximum value and the minimum value of the image data in the block are detected rather easily. This arrangement thus desirably ensures easy calculating of the tone difference of the image data in the block.

In the image processing apparatus, another preferable procedure calculates a mean value of the first image data with regard to respective pixels included in the block, and carries out the collective color conversion based on the calculated mean value. The procedure carries out the collective color conversion based on the mean value of the image data of the respective pixels in the block. This arrangement desirably ensures appropriate color conversion of the image data in the respective pixels.

In the image processing apparatus, still another preferable procedure carries out the collective color conversion of the pixels in the block, based on the first image data of a specific pixel that is located at a predetermined position in the block.

The respective pixels in the block undergo the collective color conversion, when there is a small tone difference of the first image data in the block. In such cases, the arrangement of substituting image data of an arbitrary pixel in the block for image data of the other pixels in the block does not cause any significant error. The procedure carries out the collective color conversion, based on the image data of a specific pixel that is located at a predetermined position in the block. This arrangement preferably ensures high-speed color conversion without significantly deteriorating the picture quality.

In the image processing apparatus, another preferable procedure collects pixels of two adjoining columns and two adjoining rows to one block and causes the block to undergo the above series of processing.

The arrangement of collecting four pixels defined by two adjoining columns and two adjoining rows to one block effectively detects a possible variation of the first image data in either of the vertical direction and the horizontal direction, thus ensuring appropriate color conversion.

The image processing apparatus of the present invention is preferably applied to a print control apparatus that outputs print data for controlling creation of dots to a printing device, which creates ink dots on a printing medium to print an image, thus controlling the printing device.

Namely the present invention is directed to a print control apparatus that carries out color conversion of first image data expressed by a first color system into second image data expressed by a second color system, converts the second image data into print data of a specific expression format based on dot on-off state, and outputs the print data to a printing device, which creates ink dots on a printing medium to print an image, thus controlling the printing device. The print control apparatus includes: a color conversion unit that carries out color conversion of the first image data into the second image data; a dot creation decision unit that determines the dot on-off state of each pixel, based on the second image data; and a print data supply unit that outputs a result of the determination of the dot on-off state as the print data to the printing device. The color conversion unit has: a block information detection module that collects multiple adjoining pixels of the first image data into one block and detects block information, which is related to a tone difference between the multiple adjoining pixels in the block; a first color conversion module that certifies a level of the tone difference between the multiple adjoining pixels in the block based on the detected block information, and with regard to a block having a large tone difference level, carries out color conversion by a unit of each pixel included in the block; and a second color conversion module that, with regard to a block having a small tone difference level, carries out collective color conversion for the each adjoining pixel included in the block.

The image processing apparatus of the present invention ensures high-speed color conversion while maintaining the picture quality. Application of the image processing apparatus to a print control apparatus thus effectively ensures high-speed printing of high-quality images.

The technique of the present invention may be attained by a computer that reads a program for actualizing the image processing method discussed above. Another application of the present invention is thus a recording medium, which corresponds to the image processing method.

Namely the present invention is directed to a recording medium in which a program is recorded in a computer readable manner. The program actualizes a method that carries out color conversion of first image data expressed by a first color system into second image data expressed by a second color system. The program causes a computer to attain the functions of: (A) collecting multiple adjoining pixels of the first image data into one block; (B) detecting block information, which is related to a tone difference between the multiple adjoining pixels in the block; (C) certifying a level of the tone difference between the multiple adjoining pixels in the block based on the detected block information, and with regard to a block having a large tone difference level, carrying out color conversion by a unit of each pixel included in the block; and (D) with regard to a block having a small tone difference level, carrying out collective color conversion for the each adjoining pixel included in the block.

The computer reads the program recorded in the recording medium to attain the diverse functions discussed above, thus ensuring high-speed color conversion of image data while maintaining the picture quality.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
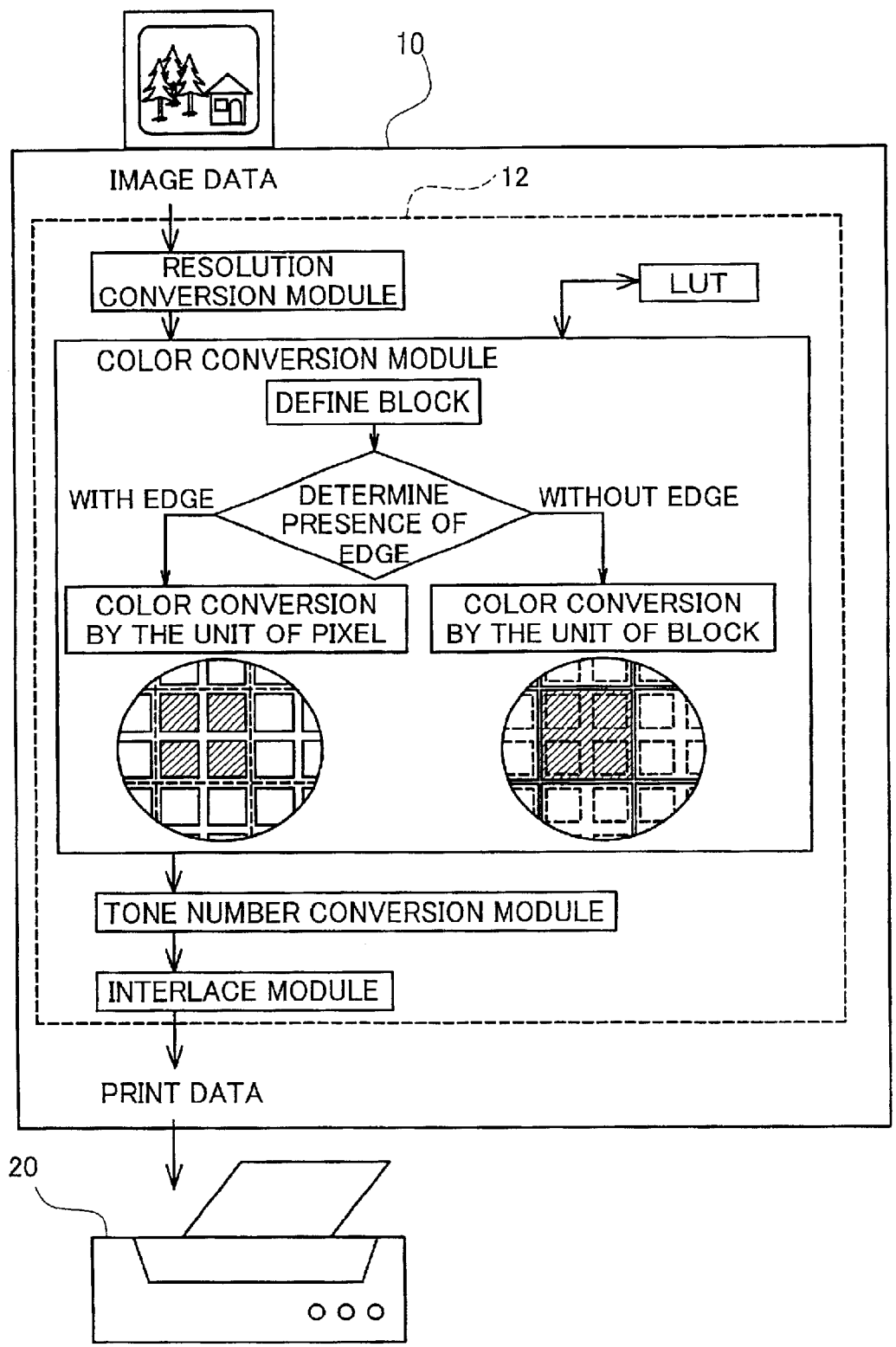
FIG. 1 is an explanatory view showing the general flow of processing executed in a printing system of the present invention.

In order to further elucidate the functions, the effects, and the advantages of the present invention, one embodiment of the present invention is discussed below in the following sequence:

A. General Flow of Processing
B. Construction of System
C. Outlines of Image Data Conversion Process
D. Color Conversion Process in Embodiment
E. Modifications A. General Flow of Processing Referring to FIG. 1, the general flow of processing carried out in the present invention is discussed below. FIG. 1 is an explanatory view showing the general flow of processing executed in a printing system of the present invention. The printing system includes a computer 10 as an image processing apparatus and a color printer 20. The computer 10 receives tone image data of an RGB color image from an image device like a digital camera or a color scanner, and converts the input image data into print data expressed by the dot on-off state of respective CMY colors printable with the color printer 20. A specific program called a printer driver 12 is used for the conversion of image data. The computer 10 may create the tone image data of the RGB color image with a diversity of application programs.

The printer driver 12 has four modules, that is, a resolution conversion module, a color conversion module, a tone number conversion module, and an interlace module. The functions of the respective modules will be described in detail later. The resolution conversion module converts the resolution of image data into a printing resolution of the image by the color printer 20. The color conversion module converts the tone image data of the RGB colors into tone image data of the CMY colors expressible by the color printer 20. The color conversion is implemented by referring to a mathematical table, which represents mapping of the combination of tone values of the RGB colors to the combination of tone values of the CMY colors. This type of mathematical table is referred to a color conversion table (LUT). The tone number conversion module converts the tone image data of the CMY colors into data following a specific expression format based on the dot on-off state. The interlace module reorders the data converted by the tone number conversion module by taking into account the order of dot creation by the color printer 20. The color printer 20 creates dots of the respective color inks on a printing medium to print a color image, based on resulting print data supplied to the color printer 20.

Referring to FIG. 1, the color conversion module of the present invention receives the resolution-converted data, collects each preset number of multiple pixels into one block, and determines whether or not each block includes an edge segment of an image. The edge segment of the image represents a part in which the tone values of image data between adjoining pixels have a difference of not less than a predetermined value. For example, the hue and the brightness drastically change across a contour of an object included in an expressed image. Such a contour corresponds to the edge segment of the image. The color conversion module of the present invention determines whether or not the edge segment is present in each block, based on the tone values of the respective pixels included in the block.

When any edge segment of the image is present in the block, the procedure carries out color conversion by the unit of each pixel included in the block by referring to the LUT.

When the block does not include any edge segment of the image, on the contrary, the procedure collectively carries out color conversion of the block. Collective color conversion of the block with the edge segment results in the rather vague edge. The color conversion by the unit of each pixel in the block with the edge segment, on the other hand, effectively maintains the sharp edge. In the block including no edge segment, the procedure collectively carries out color conversion of multiple pixels included in the block, thus ensuring high-speed color conversion. In the block without any edge segment, the respective pixels included in the block have practically similar values of the RGB tone data, which are thus color converted into practically similar values of the CMY tone data. Namely the collective color conversion of multiple pixels included in one block hardly lowers the accuracy of conversion.

As described above, the technique of the present invention collects each preset number of multiple pixels to one block, and carries out color conversion by the unit of each pixel in the block including any edge segment, while carrying out collective color conversion for the block without any edge segment. This arrangement effectively enhances the conversion speed while maintaining the picture quality. The procedure of conversion of image data including the color conversion is discussed below in detail with reference to one embodiment.

B. Construction of System

Figure 2:
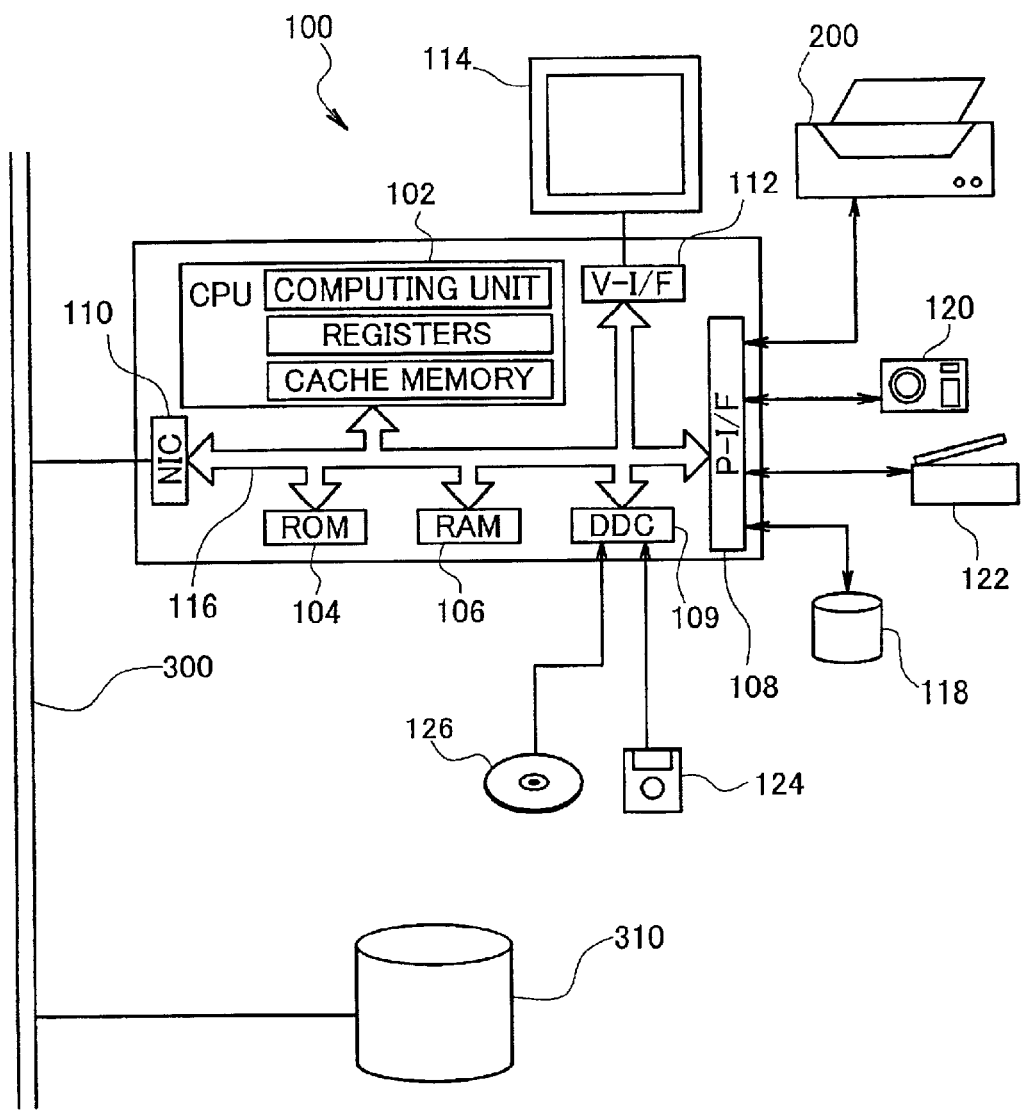
FIG. 2 schematically illustrates the construction of a computer as an image processing apparatus in one embodiment of the present invention.

FIG. 2 schematically illustrates the construction of a computer 100 as an image processing apparatus in one embodiment of the present invention. The computer 100 has a known structure including a CPU 102, a ROM 104, and a RAM 106 that are mutually connected via a bus 116.

The computer 100 is connected to a disk controller DDC 109 for reading data from a floppy disk 124 and a compact disc 126, a peripheral equipment interface P-I/F 108 for transmission of data to and from peripheral equipment, and a video interface V-I/F 112 for driving a CRT 114. A color printer 200 (discussed later) and a hard disk 118 are connected to the P-I/F 108. Connection of a digital camera 120 or a color scanner 122 to the P-I/F 108 enables images shot by the digital camera 120 or the color scanner 122 to be printed. Attachment of a network interface card NIC 110 allows the computer 100 to be connected to a communication line 300 and fetch data stored in a storage device 310 connected to the communication line.

Figure 3:
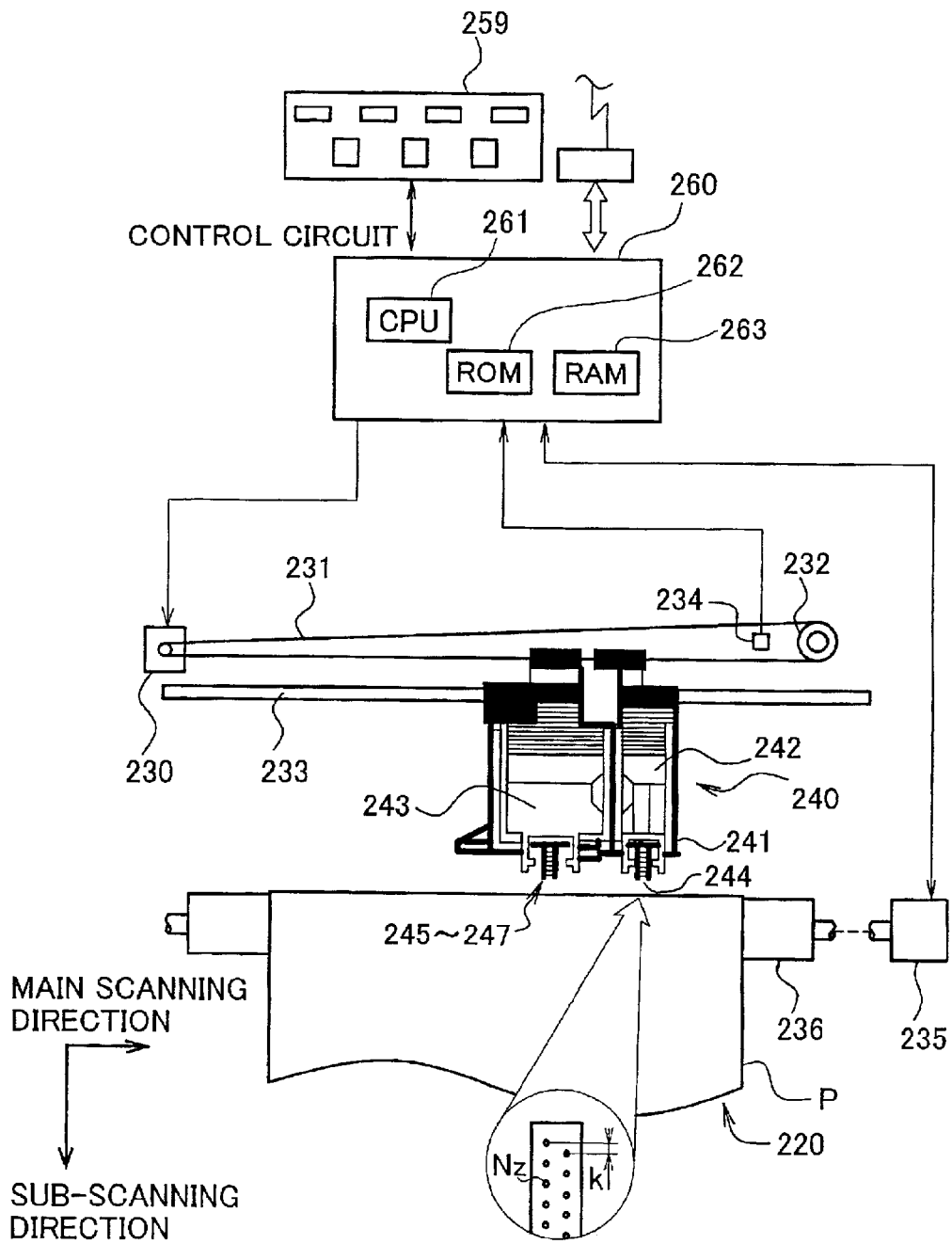
FIG. 3 schematically illustrates the structure of a color printer as an image display device of the embodiment.

FIG. 3 schematically illustrates the structure of the color printer 200 in the embodiment. The color printer 200 is an ink jet printer that is capable of creating dots of four different color inks, that is, cyan, magenta, yellow, and black. The ink jet printer may be capable of creating dots of six different color inks, that is, light cyan ink having a lower dye density and light magenta ink having a lower dye density, in addition to the above four color inks. The ink jet printer may be capable of creating dots of seven different color inks further including dark yellow ink in addition to the above six color inks. In the description below, the cyan ink, the magenta ink, the yellow ink, the black ink, the light cyan ink, the light magenta ink, and the dark yellow ink may respectively be referred to as the C ink, the M ink, the Y ink, the K ink, the LC ink, the LM ink, and the DY ink.

The color printer 200 has a mechanism of driving a print head 241 mounted on a carriage 240 to eject ink and create dots, a mechanism of actuating a carriage motor 230 to move the carriage 240 back and forth along an axis of a platen 236, a mechanism of actuating a sheet feed motor 235 to feed a sheet of printing paper P, and a control circuit 260 for controlling the creation of dots, the movement of the carriage 240, and the feed of the printing paper P.

An ink cartridge 242 for keeping therein the K ink and an ink cartridge 243 for keeping therein the C ink, the M ink, and the Y ink are attached to the carriage 240. The attachment of the ink cartridges 242 and 243 to the carriage 240 causes each ink kept in the ink cartridges to be led through an ink conduit (not shown) and supplied to each of ink ejection heads 244 through 247, which correspond to the respective color inks and are disposed on the lower face of the print head 241. One nozzle array including 48 nozzles Nz, which are arranged at a fixed nozzle pitch k, is formed in each of the ink ejection heads 244 through 247.

The control circuit 260 includes a CPU 261, a ROM 262, and a RAM 263. The control circuit 260 causes ink droplets to be ejected from the respective nozzles at adequate timings, based on the print data transmitted from the computer 100, while controlling the operations of the carriage motor 230 and the sheet feed motor 235 to control main scan and sub-scan of the carriage 240. The color printer 200 creates ink dots of the respective colors at adequate positions on the printing medium under the control of the control circuit 260, thereby printing a color image.

A diversity of known techniques may be applied to eject ink droplets from each ink ejection head. One technique uses piezoelectric elements for ink ejection. Another technique uses a heater disposed in each ink conduit to produce bubbles in the ink conduit and thereby cause ejection of ink droplets. The technique of the present invention is not restricted to the ink ejection-type printers. The color printer 200 may apply thermal transfer or another equivalent technique to create ink dots on the printing medium, or utilize static electricity to make toner powder of each color adhere onto the printing medium.

The color printer 200 may be a variable dot printer that regulates the size of ink droplets ejected from each ink ejection head or regulates the number of small ink droplets ejected simultaneously, so as to adjust the size of ink dots created on the printing medium.

The color printer 200 having the above hardware structure actuates the carriage motor 230 to move the respective ink ejection heads 244 through 247 in a main scanning direction relative to the printing paper P, while actuating the sheet feed motor 235 to shift the printing paper P in a sub-scanning direction. The control circuit 260 iteratively carries out the main scan and sub-scan of the carriage 240 according to the print data and drives the nozzles at adequate timings to eject ink droplets. The color printer 200 thus prints a color image on the printing paper P.

C. Outlines of Image Data Conversion Process

Figure 4:
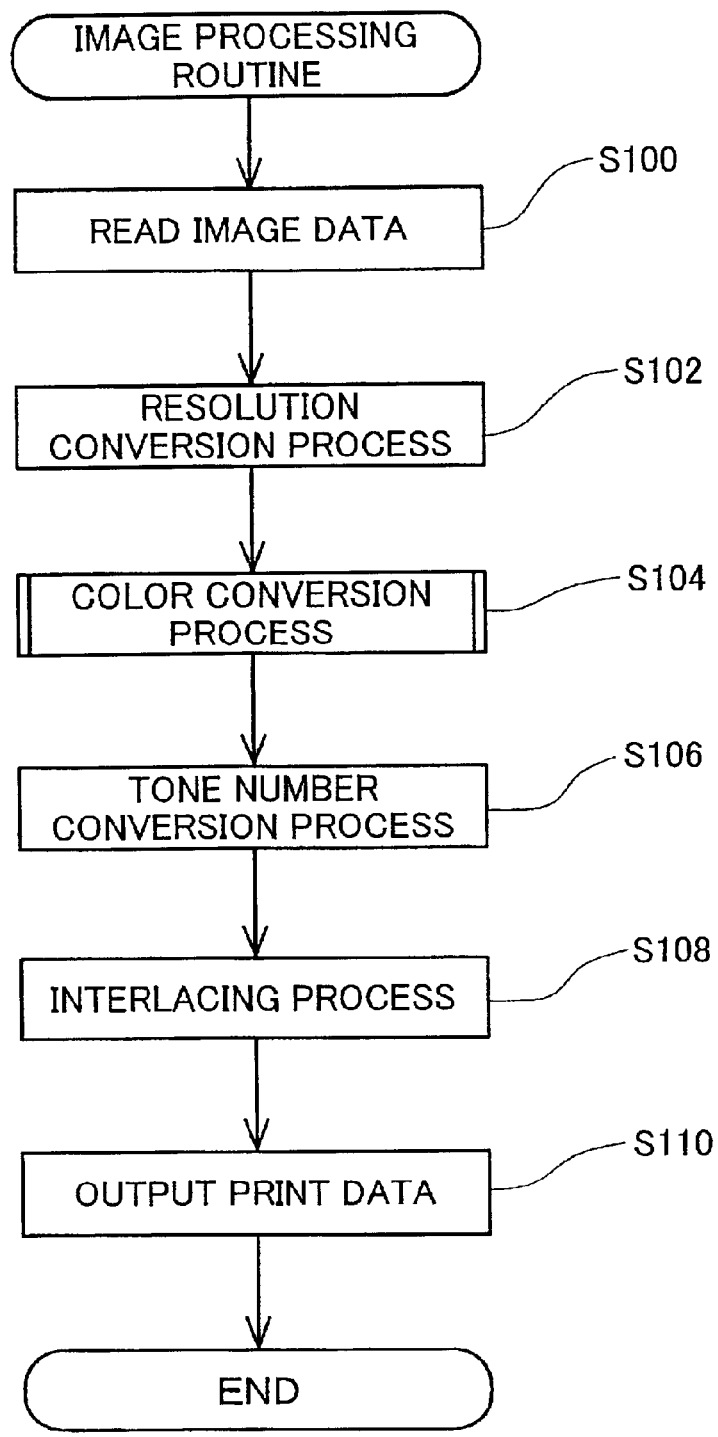
FIG. 4 is a flowchart showing an image processing routine executed in the image processing apparatus of the embodiment.

FIG. 4 is a flowchart showing an image processing routine executed in the embodiment. The computer 100 as the image processing apparatus of the embodiment causes input master image data to undergo a predetermined series of image processing, thus converting the master image data into print data. The operating system of the computer 100 activates the printer driver 12 to start this processing routine. The procedure of image processing in this embodiment is discussed briefly with reference to the flowchart of FIG. 4.

When entering the image processing routine, the printer driver 12 first reads RGB color image data, which is the object of conversion at step S100, and converts the resolution of the input image data into a printing resolution set for printing with the color printer 200 at step S102. When the resolution of the input color image data is lower than the printing resolution, the process performs linear interpolation to generate new data between existing image data and thereby convert the resolution of the input image data into the printing resolution. When the resolution of the input color image data is higher than the printing resolution, on the contrary, the process skips existing image data at a specified rate to convert the resolution of the input image data into the printing resolution.

After the conversion of the resolution, the printer driver 12 carries out color conversion of the color image data at step S104. As described above, the color conversion process converts color image data expressed by combinations of a predetermined set of base colors into image data expressed by combinations of another set of base colors. The procedure of this embodiment converts color image data expressed by combinations of tone values of R, G, and B into image data expressed by combinations of tone values of other colors, such as C, M, Y, and K, used in the color printer 200. The color conversion process is performed by referring to a three-dimensional mathematical table called a color conversion table (LUT). As discussed later, the printer driver 12 of this embodiment changes over the unit of color conversion between the block and the pixel, based on the presence or the absence of any edge segment of the image in each block, which consists of a preset number of multiple pixels. This arrangement ensures the high-speed color conversion while maintaining the picture quality.

When the color conversion is completed, the printer driver 12 carries out tone number conversion at step S106. The tone number conversion process is carried out in the following manner. The color conversion converts the RGB image data into the tone data of the respective C, M, Y, and K colors. The color-converted tone data of each color is expressed as data having 256 tones in a tone value range of 0 to 255. The color printer 200 of the embodiment takes only either the dot on state or the dot off state. It is accordingly required to convert 256-tone image data of each color into image data of two tones expressible by the color printer 200. This process of converting the number of tones is the tone number conversion.

On completion of the tone number conversion, the printer driver 12 carries out interlacing at step S108. The interlacing process rearranges the tone number-converted image data representing the dot on-off state in a specific order to be transferred to the color printer 200 by taking into account the order of dot creation. The printer driver 12 outputs resulting image data obtained by the interlacing process as print data to the color printer 200 at step S110. The color printer 200 creates ink dots of the respective colors on a printing medium according to the input print data, so that a color image corresponding to the image data is printed on the printing medium.

D. Color Conversion Process in Embodiment

Figure 5:
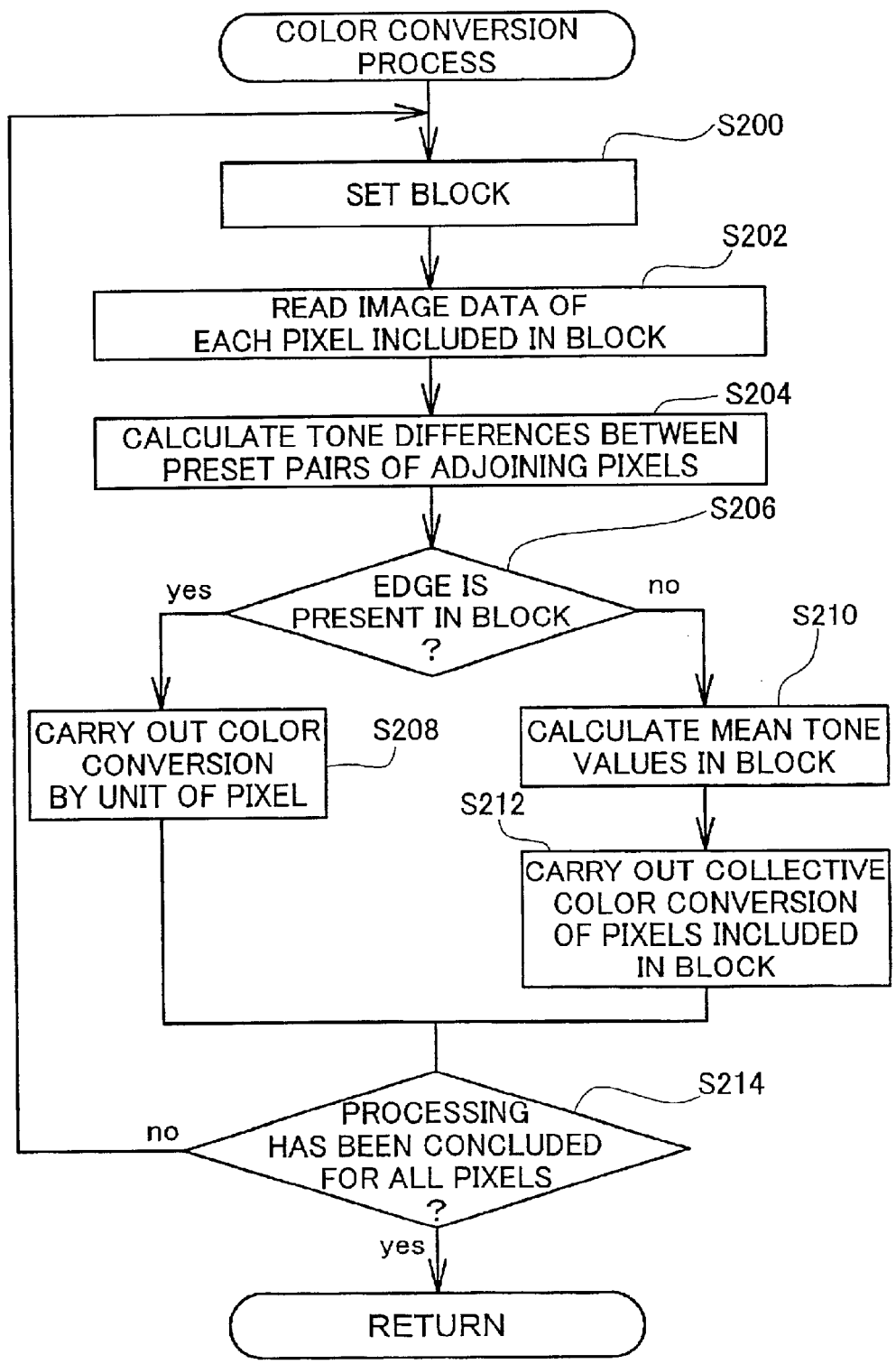
FIG. 5 is a flowchart showing a color conversion routine executed in the embodiment.

FIG. 5 is a flowchart showing a color conversion routine executed in the embodiment. This color conversion routine is carried out by the CPU 102 of the computer 100. Although the color conversion process of the embodiment converts the tone data of the RGB colors into the tone data of the C, M, Y, and K colors, the technique of the present invention is not restricted to this combination. For example, the technique of the present invention is applicable to color conversion of RGB tone data into tone data of the C, M, and Y colors or color conversion of RGB tone data into tone data of the C, M, Y, K, LC, and LM colors. The color conversion process of the embodiment is discussed below with referring to the flowchart of FIG. 5.

Figure 6A:
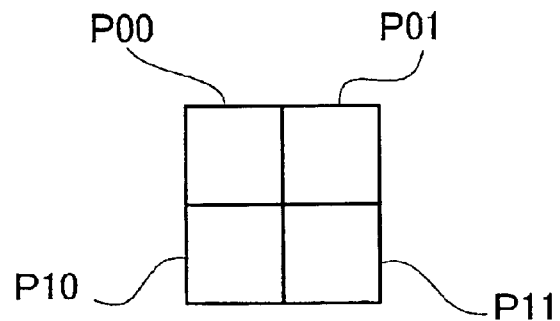
FIG. 6 shows examples of collecting a preset number of multiple adjoining pixels to one block.
Figure 6B:
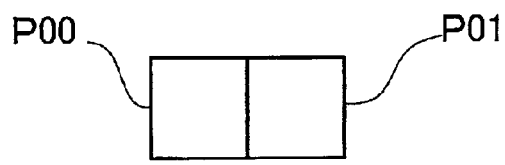

When the program enters the color conversion routine, the CPU 102 first collects each preset number of multiple adjoining pixels to one block at step S200. FIG. 6 shows examples of collecting a preset number of multiple adjoining pixels to one block. In the example of FIG. 6(a), 4 adjoining pixels, pixels P00, P01, P10, and P11 are collected to one block. In a similar manner, 9 pixels from 3 adjoining rows and 3 adjoining columns may be collected to one block. In the example of FIG. 6(b), 2 adjoining pixels, pixels P00 and P01, are collected to one block. In this manner, pixels from an identical row or column may be collected to one pixel. In the description below, it is assumed that 4 pixels are collected to one block as in the example of FIG. 6(a).

After setting a block, the CPU 102 reads RGB image data of each pixel included in the block at step S202. Here the block consists of four pixels shown in FIG. 6(a). The CPU 102 accordingly reads a combination of tone values of the RGB colors with regard to the four pixels P00, P01, P10, and P11. In the following explanation, it is assumed that the set of tone values of the R, G, and B colors with regard to the pixel P00 is (R00, G00, B00). The sets of tone values with regard to the pixel P10 and the pixel P11 are (R10, G10, B10) and (R11, G11, B11).

Figure 7:
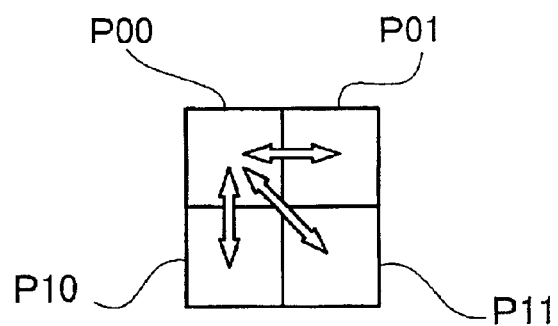
FIG. 7 shows a process of calculating tone differences between preset pairs of adjoining pixels in a block.

The CPU 102 then calculates tone differences between preset pairs of adjoining pixels included in the block, based on the input tone values at step S204. As shown in FIG. 7, the procedure calculates a tone difference between the pixels P00 and P01, a tone difference between the pixel P00 and P10, and a tone difference between the pixel P00 and P11 with regard to each color. The tone difference between the pixels P00 and P01 represents a variation in tone value in the main scanning direction (the left-right direction in the drawing of FIG. 7). The tone difference between the pixels P00 and P10 represents a variation in tone value in the sub-scanning direction (the top-bottom direction in the drawing of FIG. 7). The tone difference between the pixels P00 and P11 represents a variation in tone value in a diagonal direction.

After calculation of the tone differences between the preset pairs of adjoining pixels with regard to each color, the absolute value of each calculated tone difference is compared with a predetermined threshold value th. The CPU 102 determines the presence or absence of an edge segment in the block, based on results of the comparison at step S206.

It is determined that no edge segment is present in the block, when all the following seven relational expressions are satisfied:

$$|R00-R01|<th, |G00-G01|<th, |B00-B01|<th$$

$$|R00-R10|<th, |G00-G10|<th, |B00-B10|<th$$

$$|R00-R11|<th, |G00-G11|<th, |B00-B11|<th$$

In the case where even one of these relational expressions is not satisfied, it is determined that an edge segment is present in the block Here |X| represents the absolute value of X. Although the identical threshold value th is used for the comparison with regard to all the R, G, and B colors in this embodiment, optimum threshold values may be set for the respective R, G, and B colors. The latter arrangement enables detection of an edge segment in each block by taking into account the difference in conspicuousness among different hues.

In the case of an affirmative answer at step S206, that is, when an edge segment is present in the block, the CPU 102 carries out color conversion by the unit of each pixel included in the block by referring to the color conversion table at step S208. The details of the color conversion will be discussed later.

In the case of a negative answer at step S206, that is, when no edge segment is present in the block, the CPU 102 calculates mean tone values of the respective colors in the block at step S210. The concrete procedure calculates mean tone values Rave, Gave, and Bave of the block with regard to the respective colors according to the following equations:

$$Rave=(R00+R01+R10+R11)/4$$

$$Gave=(G00+G01+G10+G11)/4$$

$$Bave=(B00+B01+B10+B11)/4$$

The CPU 102 subsequently carries out color conversion of the resulting RGB image data (Rave,Gave,Bave) representing the calculated mean tone values of the RGB colors, thus attaining collective color conversion of the pixels included in the block at step S212.

Figure 8:
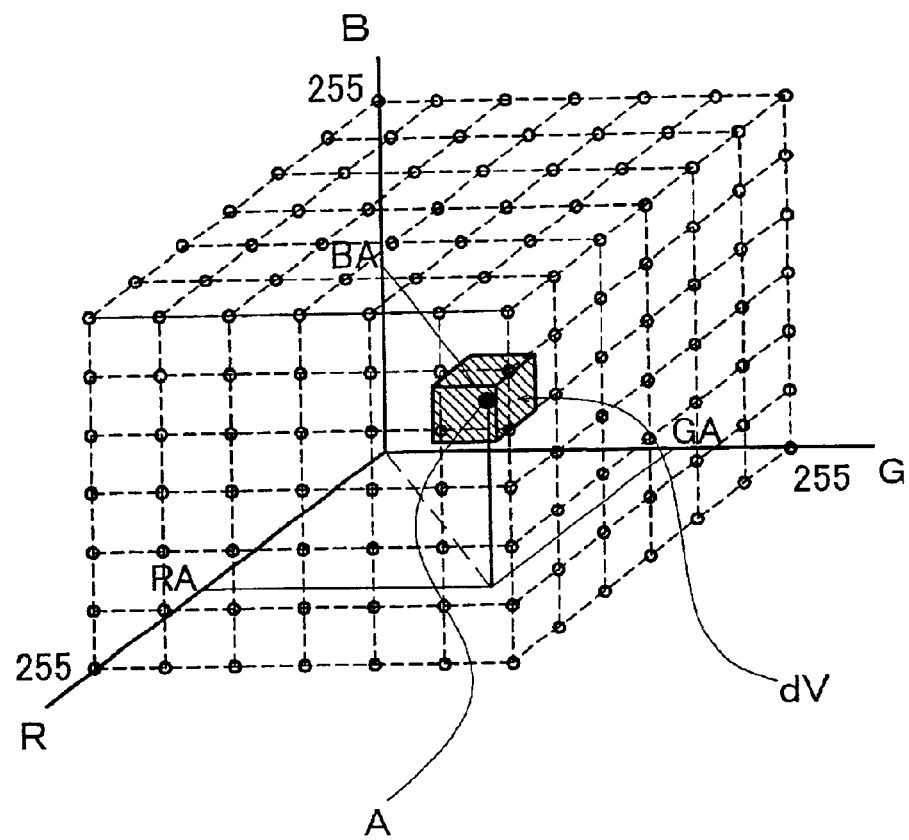
FIG. 8 shows the outline of the color conversion process carried out by referring to a color conversion table.

The procedure of color conversion of RGB image data by referring to the color conversion table (LUT) is described below. FIG. 8 conceptually shows an LUT (color conversion table) referred to in the process of color conversion. When image data has the capacity of 1 byte, the image data with regard to each of the R, G, and B colors may take any tone value in the tone range of 0 to 255. The RGB image data can thus be expressed by coordinates inside a cube, which is defined by the R, G, and B axes as three orthogonal axes and has the length of 255 for each side, as shown in FIG. 8. This cube is called the color solid. The LUT is a mathematical table, which is obtained by fragmentation of the color solid into lattices and in which each lattice point represents a combination of tone values of the C, M, Y, and K colors. Referring to the LUT in the following manner enables the high-speed color conversion. For conversion of RGB image data (RA,GA,BA), the procedure first sets a point A having the coordinates (RA,GA,BA) in the color solid and specifies a cube fragment (dV) including the point A. The procedure then reads combinations of tone values of the C, M, Y, and K colors stored at the respective apexes of the specified cube fragment (dV), and performs interpolation of the combinations of tone values, so as to specify tone values of the C, M, Y, and K colors at the point A. The procedure readily converts the RGB image data (RA,GA,BA) into the tone values of the C, M, Y, and K colors by referring to the LUT in this manner.

The processing of step S208 carries out individual color conversion of the image data (R00, G00, B00), (R01, G01, B01), (R10, G10, B10), and (R11, G11, B11) of the respective pixels included in the block by referring to the LUT. The processing of step S212 carries out color conversion of the image data (Rave, Gave, Bave) representing the mean tone values in the block. The latter process results in converting the tone values of all the pixels constituting the block into an identical tone value.

On completion of the color conversion for one block, the CPU 102 determines whether or not the color conversion has been concluded for all the pixels at step S214. The procedure returns to step S200 and repeats the above series of processing until there is no unprocessed pixel. When the color conversion has been concluded for all the pixels, the program exits from the color conversion routine of FIG. 5 and returns to the image processing routine shown in the flowchart of FIG. 4.

As described above, the color conversion process of the embodiment determines whether or not any edge segment is present in each block. In the absence of any edge segment in the block, the procedure carries out collective color conversion of the pixels included in the block, thus attaining high-speed color conversion. In the presence of any edge segment in the block, on the other hand, the procedure carries out individual color conversion by the unit of each pixel included in the block, thus attaining adequate color conversion of each pixel. The technique of the embodiment changes over the procedure of color conversion, based on the presence or absence of any edge segment in each block. Even when an image to be processed includes a large number of pixels, this arrangement desirably ensures the high-speed color conversion without deteriorating the picture quality.

E. Modifications

The color conversion process of the embodiment discussed above may have a diverse of modifications. Some examples of modification are briefly discussed below.

(1) First Modification

Figure 9:
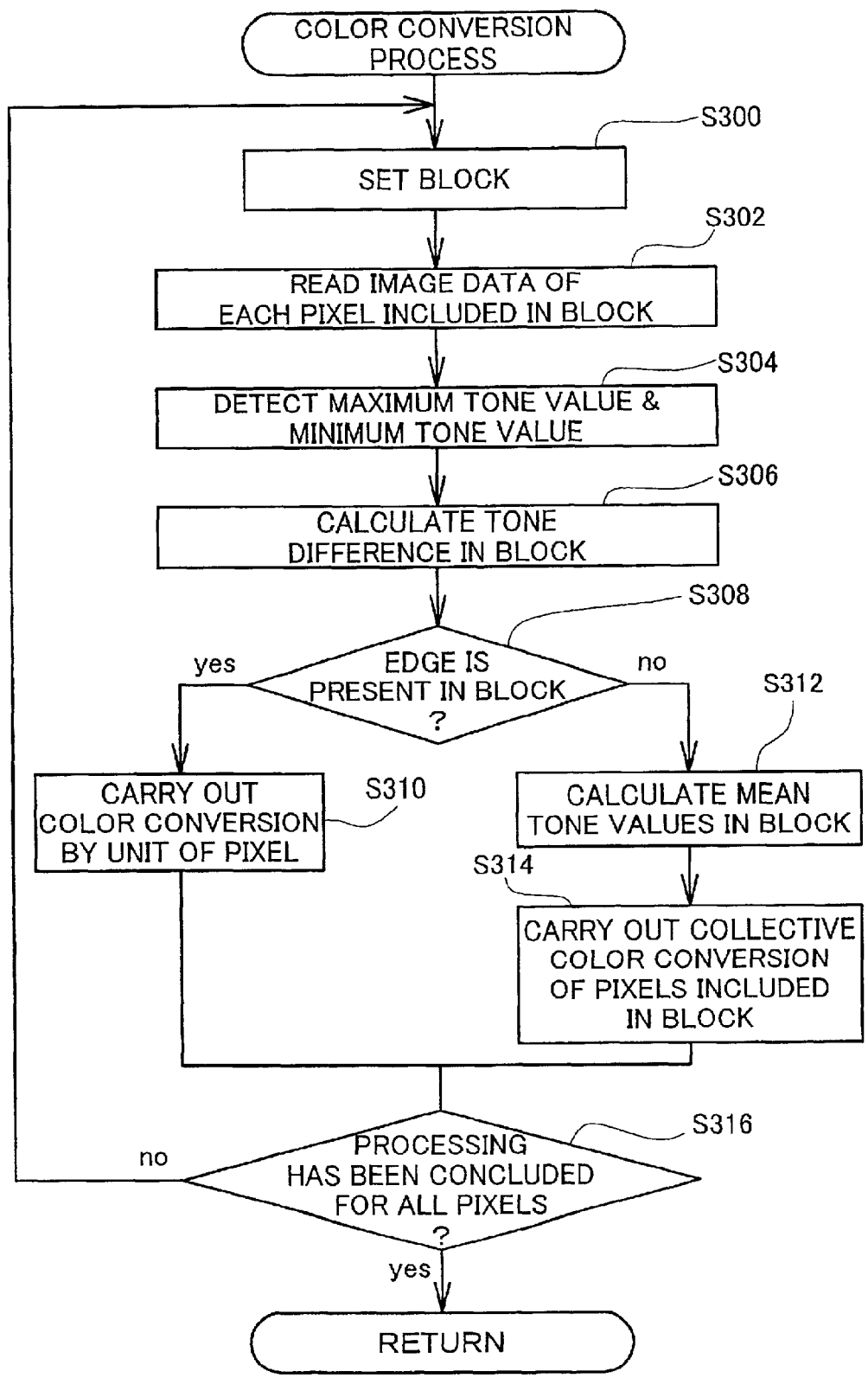
FIG. 9 is a flowchart showing a modified color conversion routine in a first modification.

FIG. 9 is a flowchart showing a modified color conversion routine in a first modification. The color conversion process of the embodiment shown in the flowchart of FIG. 5 determines the presence or absence of any edge segment in each block, based on the calculated tone differences between preset pairs of adjoining pixels in the block. The color conversion process of the first modification shown in the flowchart of FIG. 9, on the other hand, determines the presence or absence of any edge segment in each block, based on a tone difference between a maximum tone value and a minimum tone value in the block. The color conversion process of the first modification, especially the difference from the color conversion process of FIG. 5, is described below by referring to the flowchart of FIG. 9.

When the program enters the color conversion routine of the first modification, the CPU 102 first collects each preset number of multiple adjoining pixels to one block at step S300 and reads RGB data of the respective pixels included in the block at step S302, in the same manner as the color conversion process of the embodiment.

The CPU 102 then detects a maximum tone value and a minimum tone value among the tone values of the respective pixels in the block with regard to each of the R, G, and B colors at step S304. The concrete procedure extracts a maximum tone value Rmax and a minimum tone value Rmin of the color R, a maximum tone value Gmax and a minimum tone value Gmin of the color G, and a maximum tone value Bmax and a minimum tone value Bmin of the color B from the input RGB image data of the respective pixels included in the block.

The CPU 102 subsequently calculates tone differences between the maximum tone value and the minimum tone value of the respective colors in the block at step S306, and determines the presence or absence of any edge segment in the block based on the calculated tone differences of the respective colors at step S308. When all the calculated tone differences $\Delta R$, $\Delta G$, and $\Delta B$ of the R, G, and B colors are less than a predetermined threshold value th1, it is determined that no edge segment is present in the block. Otherwise it is determined that an edge segment is present in the block. Different settings adequate for the respective colors may be applied for the threshold value th1, which is used as the criterion of the determination of the presence or the absence of an edge segment.

In the case of an affirmative answer at step S308, that is, when any edge segment is present in the block, the CPU 102 carries out color conversion by the unit of each pixel included in the block by referring to the color conversion table at step S310. In the case of a negative answer at step S308, that is, when no edge segment is present in the block, the CPU 102 calculates mean tone values of the respective colors in the block at step S312 and carries out collective color conversion of the pixels in the block based on the calculated mean tone values of the respective colors at step S314, in the same manner as the color conversion process of the embodiment discussed above with the flowchart of FIG. 5.

On completion of the color conversion for one block, the CPU 102 determines whether or not the color conversion has been concluded for all the pixels at step S316. The procedure returns to step S300 and repeats the above series of processing until there is no unprocessed pixel. When the color conversion has been concluded for all the pixels, the program exits from the color conversion routine of FIG. 9 and returns to the image processing routine shown in the flowchart of FIG. 4.

The color conversion process of the first modification discussed above specifies the maximum tone value and the minimum tone value in each block and determines the presence or absence of any edge segment in the pixel, based on a tone difference between the maximum tone value and the minimum tone value. Since the maximum tone value and the minimum tone value in each block are readily specified, detection of any edge segment in the block according to the above procedure ensures the higher-speed color conversion.

(2) Second Modification

Figure 10:
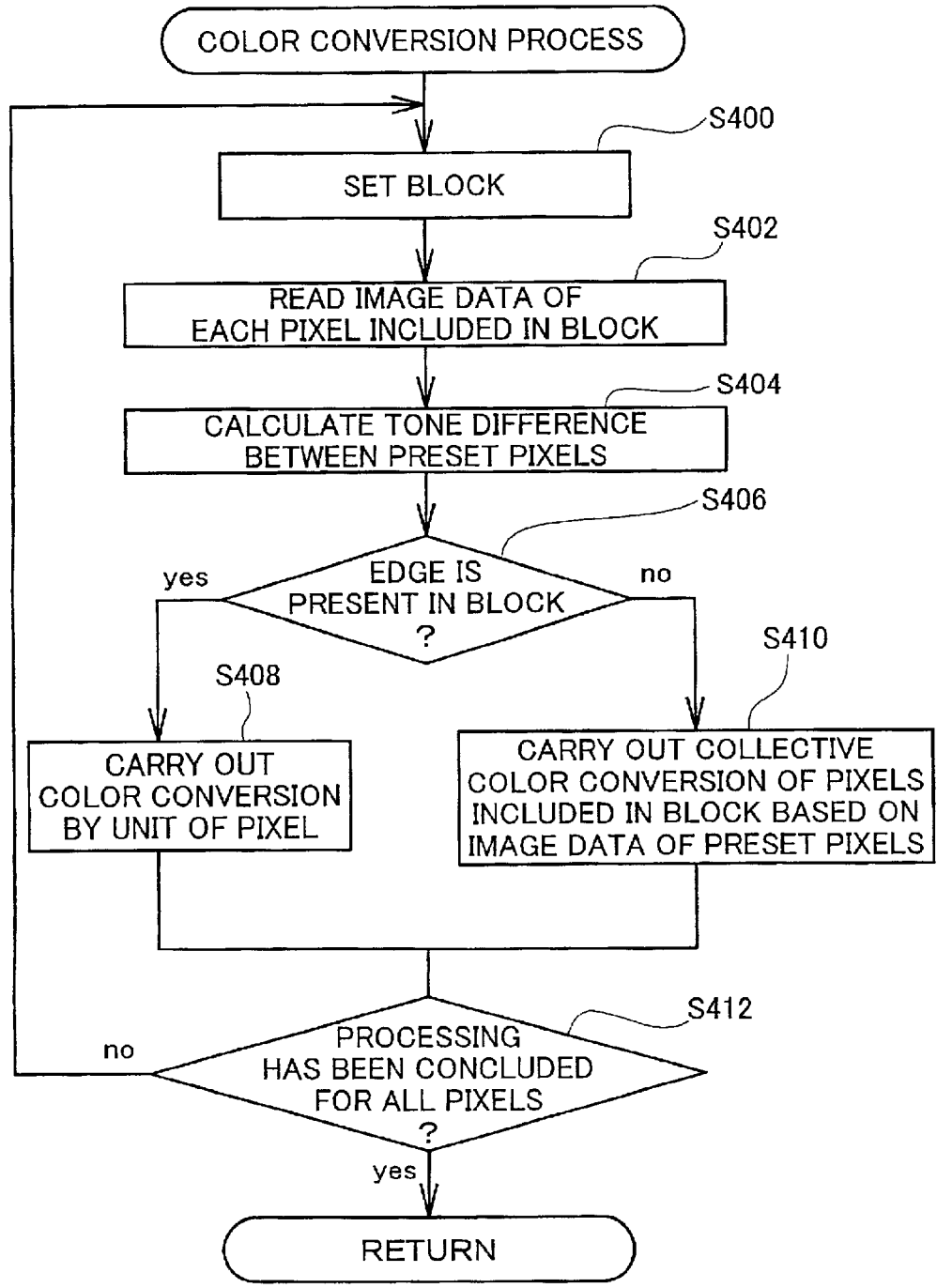
FIG. 10 is a flowchart showing another modified color conversion routine in a second modification.

The procedure of detecting any edge segment in each block and carrying out collective color conversion of the pixels in the block may be simplified as discussed below to attain higher-speed color conversion. FIG. 10 is a flowchart showing another modified color conversion routine in a second modification. The color conversion process of the second modification, especially the difference from the color conversion process of FIG. 5, is described below by referring to the flowchart of FIG. 10.

When the program enters the color conversion routine of the second modification, the CPU 102 first collects each preset number of multiple adjoining pixels to one block at step S400 and reads RGB data of the respective pixels included in the block at step S402, in the same manner as the color conversion process of the embodiment.

Figure 11:
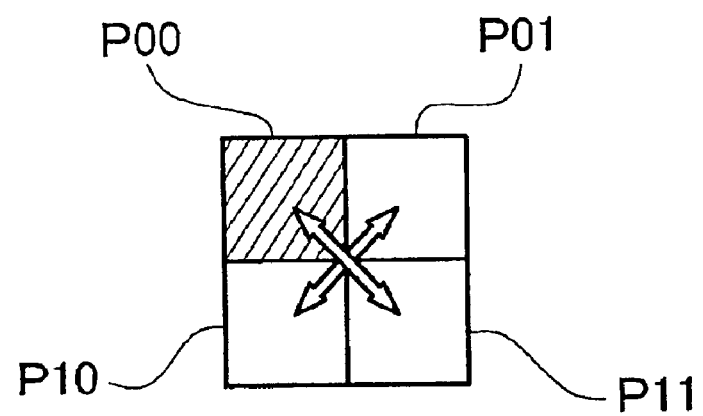
FIG. 11 shows a process of detecting any edge segment in a block and carrying out collective color conversion of pixels in the block in the color conversion process of the second modification.

The CPU 102 then calculates a tone difference between pixels P00 and P11 and a tone difference between pixels P01 and P10 with regard to each of the R, G, and B colors as shown by the open arrows in FIG. 11 at step S404. After calculating the tone differences between the two pairs of preset pixels with regard to each color, the CPU 102 compares the absolute value of each calculated tone difference with a preset threshold value th, so as to determine the presence or absence of an edge segment in the block at step S406. As discussed previously in the embodiment with reference to FIG. 7, it is assumed that the image data of the pixels P00, P01, P10, P11 are defined as (R00, G00, B00), (R01,G01,B01), (R10, G10, B10), and (R11, G11, B11).

$$|R00-R11|<th, |G00-G11|<th, |B00-B11|<th$$

$$|R01-R10|<th, |G01-G10|<th, |B01-B10|<th$$

When all the above six relational expressions are held, it is determined that no edge segment is present in the block. When even one of these relational expressions is not held, on the other hand, it is determined that an edge segment is present in the block. Here |X| denotes the absolute value of X.

In the case of an affirmative answer at step S406, that is, when any edge segment is present in the block, the CPU 102 carries out color conversion by the unit of each pixel included in the block by referring to the color conversion table at step S408.

In the case of a negative answer at step S406, that is, when no edge segment is present in the block, on the other hand, the CPU 102 carries out collective color conversion of the pixels in the block, based on the image data of a certain pixel located at a predetermined position in the block at step S410. In the absence of any edge segment in the block, it is thought that the respective pixels constituting the block have substantially the same values of image data. The procedure accordingly omits the step of calculating the mean tone values of the respective colors in the block, but uses the image data of the certain pixel in the block for the calculated mean tone values.

Hatching in FIG. 11 shows that the pixel P00 is selected as the representative pixel of the block. The processing of step S410 thus converts the RGB image data (R00, G00, B00) of the selected pixel P00 into CMYK image data (C00, M00, Y00, K00), while converting the image data of the other pixels included in the block into the same CMYK image data. Although the pixel P00 is selected in the example of FIG. 11, any other pixel located at any other position may be selected as the representative pixel of the block.

On completion of the color conversion for one block, the CPU 102 determines whether or not the color conversion has been concluded for all the pixels at step S412. The procedure returns to step S400 and repeats the above series of processing until there is no unprocessed pixel. When the color conversion has been concluded for all the pixels, the program exits from the color conversion routine of FIG. 10 and returns to the image processing routine shown in the flowchart of FIG. 4.

The color conversion process of the second modification discussed above requires calculation of only the tone differences between two pairs of pixels to detect the presence or absence of an edge segment in the block. This arrangement thus ensures the high-speed determination of the presence or absence of any edge segment. When no edge segment is present in the block, the procedure carries out collective color conversion of the pixels included in the block, based on the image data of a certain pixel located at a predetermined position in the block. This arrangement does not require calculation of the mean tone values in the block, thus quickening the color conversion process.

The above embodiment and its modifications are to be considered in all aspects as illustrative and not restrictive. There may be many modifications, changes, and alterations without departing from the scope or spirit of the main characteristics of the present invention.

For example, for the clarity of explanation, the above embodiment regards to the color conversion of the RGB image data into the CMYK image data. The technique of the present invention is also applicable to color conversion of RGB image data into image data of the C, M, and Y colors or color conversion of RGB image data into image data of the C, M, Y, K, LC, and LM colors. The technique is also preferably applied to color conversion of RGB image data into RGB image data having different tones.

The software programs (application programs) to actualize the functions discussed above may be supplied to the main memory of the computer system or to an external storage device via a communication line. The software programs may alternatively be read from recording media, such as CD-ROMS and floppy disks.

The image display device is not restricted to the printing apparatus that creates ink dots on a printing medium to print an image. For example, the technique of the present invention may be applied for a liquid crystal display device that disperses luminescence spots on the screen of a liquid crystal display at appropriate densities, so as to express an image with a continuously varying tone.

The scope and spirit of the present invention are indicated by the appended claims, rather than by the foregoing description.

What is claimed is:

1. An image processing apparatus that carries out color conversion of first image data expressed by a first color system into second image data expressed by a second color system, said image processing apparatus comprising:
   a block information detection module that collects multiple adjoining pixels of the first image data into one block and detects block information, which is related to a tone difference between the multiple adjoining pixels in the block;
   a first color conversion module that certifies a level of the tone difference between the multiple adjoining pixels in the block based on the detected block information, and with regard to a block having a large tone difference level, carries out color conversion by a unit of each pixel included in the block; and
   a second color conversion module that, with regard to a block having a small tone difference level, carries out collective color conversion for the each adjoining pixel included in the block.

2. An image processing apparatus in accordance with claim 1, wherein said block information detection module calculates the tone difference of the first image data between the multiple adjoining pixels in the block as the block information,
   said first color conversion module carries out the color conversion, when the calculated tone difference is not less than a preset value, and
   said second color conversion module carries out the collective color, when the calculated tone difference is less than the preset value.

3. An image processing apparatus in accordance with claim 2, said image processing apparatus further comprising:
   a color conversion table storage unit that stores therein a color conversion table, which represents mapping of a combination of tone values of respective colors in the first color system to a combination of tone values of respective colors in the second color system,
   wherein said first color conversion module and said second color conversion module respectively refer to the color conversion table to implement the color conversion.

4. An image processing apparatus in accordance with claim 2, wherein said block information detection module calculates a tone difference of the first image data between specific pixels that hold a predetermined positional relationship in the block.

5. An image processing apparatus in accordance with claim 2, wherein said block information detection module calculates a difference between a maximum value and a minimum value of the first image data in the block as the tone difference of the first image data.

6. An image processing apparatus in accordance with claim 2, wherein said second color conversion module calculates a mean value of the first image data with regard to respective pixels included in the block and carries out the collective color conversion based on the calculated mean value.

7. An image processing apparatus in accordance with claim 2, wherein said second color conversion module carries out the collective color conversion, based on the first image data of a specific pixel that is located at a predetermined position in the block.

8. An image processing apparatus in accordance with claim 2, wherein said block information detection module collects pixels of two adjoining columns and two adjoining rows into the block.

9. A print control apparatus that carries out color conversion of first image data expressed by a first color system into second image data expressed by a second color system, converts the second image data into print data of a specific expression format based on dot on-off state, and outputs the print data to a printing device, which creates ink dots on a printing medium to print an image, thus controlling said printing device, said print control apparatus comprising:
   a color conversion unit that carries out color conversion of the first image data into the second image data;
   a dot creation decision unit that determines the dot on-off state of each pixel, based on the second image data; and
   a print data supply unit that outputs a result of the determination of the dot on-off state as the print data to said printing device,
   wherein said color conversion unit comprises:
   a block information detection module that collects multiple adjoining pixels of the first image data into one block and detects block information, which is related to a tone difference between the multiple adjoining pixels in the block;
   a first color conversion module that certifies a level of the tone difference between the multiple adjoining pixels in the block based on the detected block information, and with regard to a block having a large tone difference level, carries out color conversion by a unit of each pixel included in the block; and
   a second color conversion module that, with regard to a block having a small tone difference level, carries out collective color conversion for the each adjoining pixel included in the block.

10. A print control apparatus in accordance with claim 9, wherein said block information detection module calculates the tone difference of the first image data between the multiple adjoining pixels in the block as the block information,
    said first color conversion module carries out the color conversion, when the calculated tone difference is not less than a preset value, and
    said second color conversion module carries out the collective color conversion, when the calculated tone difference is less than the preset value.

11. An image processing method that carries out color conversion of first image data expressed by a first color system into second image data expressed by a second color system, said image processing method comprising the steps of:
    (A) collecting multiple adjoining pixels of the first image data into one block;
    (B) detecting block information, which is related to a tone difference of the first image data between the multiple adjoining pixels in the block;
    (C) certifying a level of the tone difference between the multiple adjoining pixels in the block based on the detected block information, and with regard to a block having a large tone difference level, carrying out color conversion by a unit of each pixel included in the block; and
    (D) with regard to a block having a small tone difference level, carrying out collective color conversion for the each adjoining pixel included in the block.

12. An image processing method in accordance with claim 11, wherein said step (B) calculates the tone difference between the multiple adjoining pixels in the block, based on the first image data of the respective pixels;

said step (C) carries out the color conversion, when the calculated tone difference is not less than a preset value, and said step (D) carries out the collective color conversion, when the calculated tone difference is less than the preset value.

13. A recording medium in which a program is recorded in a computer readable manner, said program actualizing a method that carries out color conversion of first image data expressed by a first color system into second image data expressed by a second color system, said program causing a computer to attain the functions of:

(A) collecting multiple adjoining pixels of the first image into one block;

(B) detecting block information, which is related to a tone difference of the first image data between the multiple adjoining pixels in the block;

(C) certifying a level of the tone difference between the multiple adjoining pixels in the block based on the detected block information, and with regard to a block having a large tone difference level, carrying out color conversion by a unit of each pixel included in the block; and (D) with regard to a block having a small tone difference level, carrying out collective color conversion for the each adjoining pixel included in the block.

14. A recording medium in accordance with claim 13, wherein said function (B) calculates the tone difference between the multiple adjoining pixels in the block, based on the first image data of the respective pixels;

said function (C) carries out the color conversion, when the calculated tone difference is not less than a preset value, and said function (D) carries out the collective color conversion, when the calculated tone difference is less than the preset value.

15. A program for actualizing a method that carries out color conversion of first image data expressed by a first color system into second image data expressed by a second color system, said program causing a computer to attain the functions of:

(A) collecting multiple adjoining pixels of the first image data into one block;

(B) detecting block information, which is related to a tone difference of the first image data between the multiple adjoining pixels in the block;

(C) certifying a level of the tone difference between the multiple adjoining pixels in the block based on the detected block information, and with regard to a block having a large tone difference level, carrying out color conversion by a unit of each pixel included in the block; and (D) with regard to a block having a small tone difference level, carrying out collective color conversion for the each adjoining pixel included in the block.

16. A program in accordance with claim 15, wherein said function (B) calculates the tone difference between the multiple adjoining pixels in the block, based on the first image data of the respective pixels;

said function (C) carries out the color conversion, when the calculated tone difference is not less than a preset value, and said function (D) carries out the collective color conversion, when the calculated tone difference is less than the preset value.

* * * * *